March 14, 1944.  J. C. DRADER  2,344,292
METHOD OF FINISHING GEARS
Filed June 24, 1940
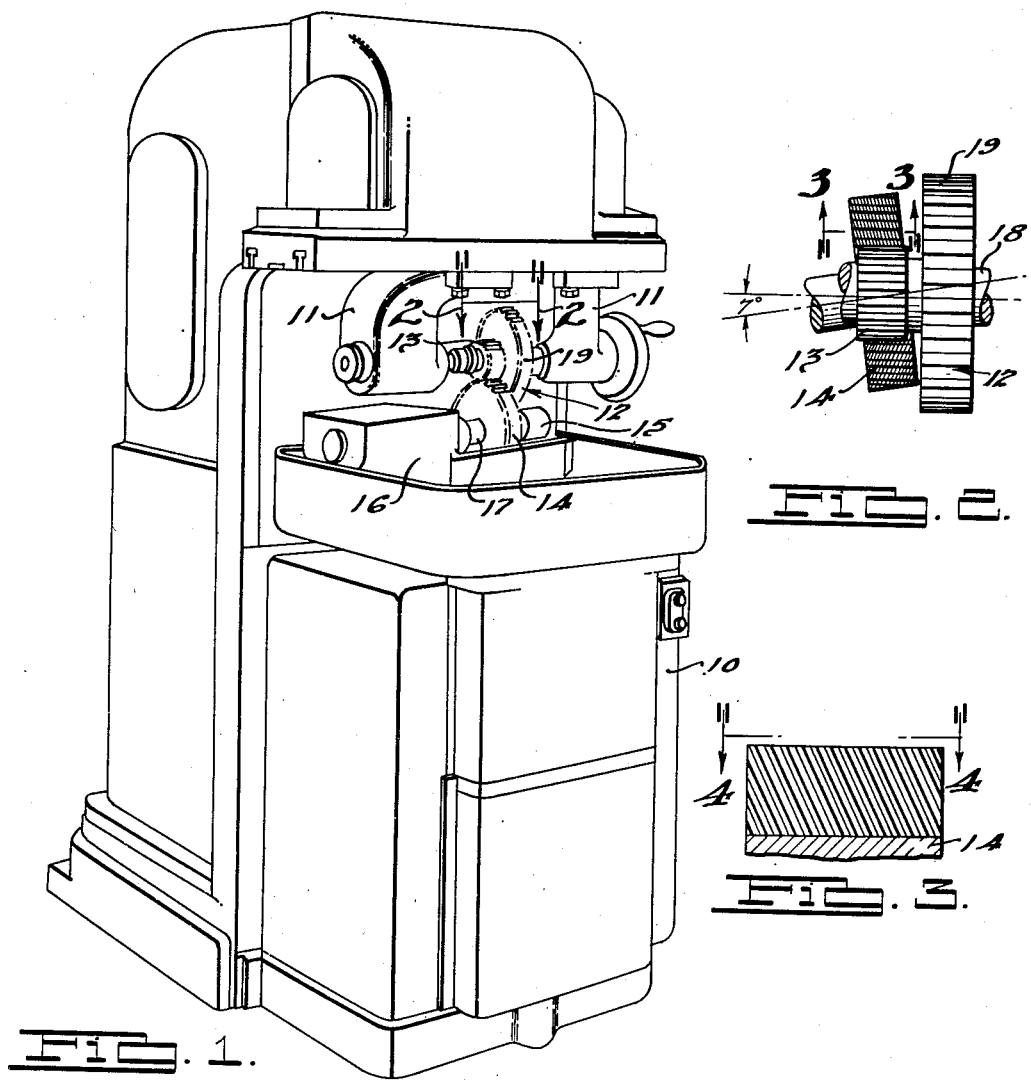
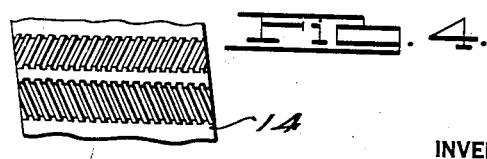
INVENTOR
Joseph C. Drader.
BY
Harness, Dickey & Pierce
ATTORNEYS.

Patented Mar. 14, 1944

2,344,292

UNITED STATES PATENT OFFICE 2,344,292

METHOD OF FINISHING GEARS

Joseph C. Drader, Detroit, Mich., assignor to Michigan Tool Company, Detroit, Mich., a corporation of Delaware Application June 24, 1940, Serial No. 342,042

6 Claims. (Cl. 90—1.6)

My invention relates to a method and means for machining gears, and particularly to a method and machine for shaving gears to predetermined accurate form.

My invention is useful particularly for machining a gear of a cluster set which, because of its adjacent disposition, limits the crossed axis relation between the gear and cutting tool to a small angle. It has been the practice, when constructing finishing tools of the shaving type, to provide narrow lands throughout the flank length of the teeth spaced by narrow slots which were usually disposed in the plane of the roll of the tool. A proper degree of crossed axis relationship was set up between the axis of the tool and gear which produced the shaving of the gear teeth flanks by the plurality of the lands from the root to the crown of the gear teeth. To spread the bands of cuts produced by the individual lands, an additional movement was provided laterally of the mated teeth, either by the axial movement of the tool or gear or by a movement of one of the axes in a plane normal thereto. This spreading of the band of the plurality of cuts produced by the lands, finished the entire tooth width of the gear teeth to accurate predetermined form.

The cutting tool employed to practice my method has similar lands formed on the flanks of the teeth with the slots between the lands disposed at an angle of substantially 25 degrees to a plane normal to the tool axis. The lands and grooves on one side of a tooth are tilted to the left from the root to the crown. On the opposite side of the teeth, the lands and grooves are disposed to the right from the root to the crown of the teeth. It was found that for an angle of crossed axis relation less than 10 degrees that the lands and grooves on the flanks of the teeth of the tool should be disposed at an angle of substantially 25 degrees, this angle varying from 20 to 30 degrees, depending upon the degree of crossed axes present.

The machine drives the tool in rotation to drive the gear, the number of teeth on the tool being more or less than a multiple of the teeth of the gear to be finished to produce a "hunting" effect so that the gear teeth will progressively move relative to those of the tool. The machine is also constructed to provide an additional movement, either along the axis of the tool or gear, or in a plane normal to a plane through the gear and tool to spread the lines of cut produced by the lands into a band over the entire length of the teeth.

Accordingly, the main objects of my invention are; to provide a method of accurately finishing a form to flanks of gear teeth when employing a small crossed axis relation; to provide lands and grooves on the flanks of the teeth of a cutting tool disposed at an angle to the plane of the roll of the gear and related to the small angle of crossed axis relation so as to produce the form desired; to provide a method of finishing the teeth of gears when employing a small crossed axis relationship by directly proportioning the tilt of the cutting lands on the tool teeth to the angle of crossed axis relation between the gear and the tool; to machine the flanks of the teeth of gears by a tool, the axes of which are crossed at an angle of less than 10 degrees and the lands and grooves on the teeth flanks of the tool are tilted at an angle of substantially 25 degrees from the plane of the roll of the tool; to relate the angular disposition of the cutting edges on the flanks of the teeth of the finishing tool with crossed axis relationship therebetween; to provide an angular tilt to the lands and grooves of tool teeth to the left of a plane to the roll of the gear on one side and to the right thereof on the opposite side; to provide a method of finishing a gear of a cluster which is closely adjacent to another gear thereof by relating the angular disposition of the crossed axis relation between the gear and tool to the angular disposition of the lands and grooves on the cutter teeth; and in general, to provide a method of finishing gears which produces true accurate form on the teeth flanks when the angular disposition between the axis of the gear and tool is less than 10 degrees.

Other objects and features of novelty of my invention will be either specifically pointed out or will become apparent when referring, for a better understanding of my invention, to the following description taken in conjunction with the accompanying drawing, wherein:

Figure 1 is a perspective view of a machine in which a gear and tool are mounted, which is capable of practicing my method;

Fig. 2 is an enlarged broken view of the gear and tool mounted in the machine illustrated in Fig. 1, as viewed from the line 2—2 thereof;

Fig. 3 is an enlarged broken sectional view of a portion of the tool illustrated in Fig. 2; and Fig. 4 is a view of the tooth of the tool illustrated in Fig. 3, as viewed from the line 4—4 thereof.

In Fig. 1, I have illustrated a machine 10 having a support 11 for a gear cluster 12, the gear 13 of which is to be accurately finished. A cutting tool 14 is mounted on a support 15 and driven by mechanism 16 in rotation. Timing mechanism is provided (not herein illustrated) which controls the rotation of the tool in one direction for a predetermined time, after which the rotation is reversed and the tool operated in the opposite direction for an additional predetermined length of time. Additional movement is provided to the tool 14 for advancing the tool either along its axis 17 or in a plane parallel to the axis 18 of the gear cluster.

Referring more particularly to Fig. 2, it will be noted that the gear 13 is directly adjacent to the gear 19 of the cluster 12. Since the principle of finishing gears which is employed in my method embodies such disposition of the gear and tool that their axes are in angular relation to each other, it will be noted that this angle in the relationship illustrated in Fig. 2 is small, being less than 10 degrees. When this relationship is employed, the slots and, therefore, the lands on the flanks of the teeth of the cutting tool are disposed substantially in the roll of the tool. It was found that when attempting to machine gears by the crossed axis method at an angle less than 10 degrees, that the angular disposition of the slots, and, therefore, the lands, becomes critical and should be limited between substantially 20 and 30 degrees.

Where an angular relationship of 10 degrees exists between the axes, as illustrated in Fig. 2, it was found that a 25 degree angular tilt to the slots and lands was the proper angle to produce an involute form on the flanks of the teeth of the gear. Where greater or lesser angles were employed, an involute form was not produced because of too great or too little machining on the flank portions of the teeth of the gear. As a result, for crossed axis relationship of less than 10 degrees the angular disposition of the cutting edges on the lands should approach the 25 degree angle above referred to.

Further, it was found that to produce the desired form on both flanks of each tooth that the angular disposition of the lands should deviate to the left from the vertical when considered from the root to the crown of the tooth on one flank and to the right of the vertical on the opposite flank. When viewing a flank of the tooth as illustrated in Fig. 3, the angular relationship of the cutting edges would be such that the lands would appear to be parallel. This is evident from the plan view of the tooth as illustrated in Fig. 4.

Accordingly, I have provided a method of machining teeth of gears of a cluster, which limits the angular disposition of the cutting edge which includes tilting the cutting edges on the teeth an amount proportionate to the angle of crossed axis relationship such as to produce accurate involute forms on the gear teeth. When the angular crossed axis relationship is less than 10 degrees, the angular tilt of the cutting edges should be approximately 25 degrees, disposed in an opposite sense on the opposite flanks of the teeth.

While I have described and illustrated but a single embodiment of my invention, it will be apparent to those skilled in the art that various changes, omissions, additions, and substitutions may be made therein without departing from the spirit and scope of my invention, as set forth in the accompanying claims.

What I claim is:

1. The method of finishing teeth of a gear disposed adjacent to a gear of a cluster which includes the steps of, mounting a gear and tool with the axes crossed at an angle less than 10 degrees to avoid interference with said adjacent gear, and machining by the relative movement in rotation between the gear and tool with cutting edges on the face of the flanks of the tool teeth disposed at an angle of substantially 25 degrees to the plane of the roll to machine involute forms on the gear teeth flanks.

2. The method of finishing teeth of a gear disposed adjacent to a gear of a cluster which includes the steps of, mounting a gear and tool with the axes crossed at an angle less than 10 degrees to avoid interference with said adjacent gear, and machining by the relative movement in rotation between the gear and tool with cutting edges on the face of the flanks of the tool teeth disposed at an angle of substantially 25 degrees to the plane of the roll to machine involute forms on the gear teeth flanks, and providing an additional increment of movement between the gear and tool for spreading the band of cut over the entire length of gear teeth.

3. The method of machining the teeth of a gear disposed adjacent to a gear of a cluster which includes the steps of, mating a cutting tool with the gear, with the axes thereof crossed at an angle of less than 10 degrees to avoid interference with said adjacent gear, rotating the gear and tool one by the other, machining the flanks of the gear teeth by cutting edges disposed at an angle of 20 to 30 degrees from the plane of the roll of the gear to machine involute forms on the gear teeth flanks.

4. The method of machining the teeth of a gear disposed adjacent to a gear of a cluster which includes the steps of, mating a cutting tool with the gear, with the axes thereof crossed at an angle of less than 10 degrees to avoid interference with said adjacent gear, rotating the gear and tool one by the other, machining the flanks of the gear teeth by cutting edges disposed at an angle of 20 to 30 degrees from the plane of the roll of the gear to machine involute forms on the gear teeth flanks, and providing an additional movement between the gear and tool to produce the spreading of the plurality of lines of cut over the entire length of the gear teeth flanks.

5. The method of machining the teeth of a gear disposed adjacent to a gear of a cluster which includes the steps of, mating a cutting tool with the gear, with the axes thereof crossed at an angle of less than 10 degrees to avoid interference with said adjacent gear, rotating the gear and tool one by the other, machining the flanks of the gear teeth by cutting edges disposed at an angle of 20 to 30 degrees from the plane of the roll of the gear to machine involute forms on the gear teeth flanks, the angular tilt to the cutting edges being of the opposite sense on opposite sides of the teeth.

6. The method of machining the teeth of a gear disposed adjacent to a gear of a cluster which includes the steps of, mating a cutting tool with the gear, with the axes thereof crossed at an angle of less than 10 degrees to avoid interference with said adjacent gear, rotating the gear and tool one by the other, machining the flanks of the gear teeth by cutting edges disposed at an angle of 20 to 30 degrees from the plane of the roll of the gear to machine involute forms on the gear teeth flanks, the angular tilt to the cutting edges being of the opposite sense on opposite sides of the teeth, and providing an additional increment of movement between the gear and tool to spread the plurality of lines of cut into overlapping bands over the entire length of the gear teeth flanks.

JOSEPH C. DRADER.